United States Patent
Tsai et al.

(10) Patent No.: US 8,641,908 B2
(45) Date of Patent: *Feb. 4, 2014

(54) METHOD OF RECOVERING POLYHYDROXYALKANOATES (PHAS) FROM MUNICIPAL WASTE SLUDGE

(75) Inventors: Yung-Pin Tsai, Puli Township (TW); Meng-Shan Lu, Fongshan (TW); Chih-Chi Yang, Miaoli (TW); Shou-Te Chen, Sihu Township (TW)

(73) Assignee: National Chi Nan University, Puli, Nantou (TW)

( * ) Notice: Subject to any disclaimer, the term of this patent is extended or adjusted under 35 U.S.C. 154(b) by 608 days.

This patent is subject to a terminal disclaimer.

(21) Appl. No.: 12/950,570

(22) Filed: Nov. 19, 2010

(65) Prior Publication Data
US 2012/0006754 A1   Jan. 12, 2012

(30) Foreign Application Priority Data
Jul. 9, 2010   (TW) .............................. 99122694 A

(51) Int. Cl.
| B01D 21/00 | (2006.01) |
| C02F 1/52 | (2006.01) |
| C02F 1/76 | (2006.01) |
| B01D 37/00 | (2006.01) |
| C02F 1/00 | (2006.01) |
| C02F 1/34 | (2006.01) |

(52) U.S. Cl.
USPC ........... 210/710; 210/756; 210/413; 210/767; 210/748.02; 210/748.03; 210/748.05; 210/748.16; 210/739; 210/774; 210/787

(58) Field of Classification Search
USPC ..................... 210/756, 713, 710, 767, 748.02, 210/748.03, 748.05, 748.16, 739, 774, 787
See application file for complete search history.

(56) References Cited

U.S. PATENT DOCUMENTS

| 5,536,419 A | * | 7/1996 | Escalona et al. | ............. | 210/767 |
| 6,043,063 A | * | 3/2000 | Kurdikar et al. | ............. | 435/135 |

OTHER PUBLICATIONS

Punrattanasin, W., "The Utilization of Activated Sludge Polyhydroxyalkanoates for the Production of Biodegradable Plastics", Virginia Polytechnic Institute and State University, Apr. 13, 2001.*

Tamer et al, "Disruption of *Alcaligenes latus* for Recovery of Poly(ä-hydroxybutyric acid): Comparison of High-Pressure Homogenization, Bead Milling, and Chemically Induced Lysis"; NPL: Ind. Eng. Chem. Res. 37: 1807-1814—published on Mar. 25, 1998.*

* cited by examiner

*Primary Examiner* — Nam X Nguyen
*Assistant Examiner* — Nader Hossaini
(74) *Attorney, Agent, or Firm* — Panitch Schwarze Belisario & Nadel LLP

(57) ABSTRACT

A method of recovering polyhydroxyalkanoates (PHAs) from municipal waste sludge includes: (a) measuring a solid content in the municipal waste sludge in terms of a volatile suspended solid in the municipal waste sludge; (b) removing supernatant from the municipal waste sludge; (c) freezing the municipal waste sludge; (d) conducting a pretreatment of the municipal waste sludge that has been frozen; (e) adding a surfactant into the pretreated sludge to obtain a slurry; (f) adding a controlled amount of sodium hypochlorite solution to the municipal waste sludge obtained in step (e), a ratio of a volume of the sodium hypochlorite solution to the solid content of the municipal waste sludge ranging from 0.67 mg/ml to 1.25 mg/ml and being defined as a liquid-solid ratio; and (g) separating PHAs from non-PHAs substances in the municipal waste sludge obtained in the step (f).

10 Claims, 2 Drawing Sheets

METHOD OF RECOVERING POLYHYDROXYALKANOATES (PHAS) FROM MUNICIPAL WASTE SLUDGE

CROSS-REFERENCE TO RELATED APPLICATION

This application claims priority of Taiwanese application no. 099122694, filed on Jul. 9, 2010.

BACKGROUND OF THE INVENTION

1. Field of the Invention

This invention relates to a method of recovering polyhydroxyalkanoates (PHAs), and more particularly to a method of recovering PHAs from municipal waste sludge.

2. Description of the Related Art

Polyhydroxyalkanoates (PHAs) are capable of being synthesized by microbial species present in municipal waste sludge or in an environment containing a carbon source and limited nutrients, such as nitrogen, phosphorous, sulfur, oxygen, magnesium, etc. PHAs are aliphatic polyesters accumulated in cells of PHAs producing microbial species. Polyhydroxybutyrate (PHB) and polyhydroxyvalerate (PHV) are commonly known PHAs that are synthesized by microbial species. PHAs are biodegradable, extendable and thermoplastic materials that are similar to polyethylene (PE) and polystyrene (PS) in terms of physical properties.

With environmental problems becoming more serious, the recovery of PHAs has attracted more interest. In conventional methods, microbial species are cultured to produce PHAs, which are then recovered by extraction. Examples of the conventional methods are disclosed in U.S. Pat. No. 7,141,400, Taiwan patent no. 283250, WO publication no. 2006/035889 and US patent application publication no. 2008/0193987.

PHAs are recovered using sodium hypochlorite, chloroform, or a surfactant in the prior art disclosed in (1) E. Berger et al., "PHB recovery by hypochlorite digestion of non-PHB biomass," Biotechnology Techniques (1989), vol. 3, no. 4, pages 227-232; (2) Sei Kwang Hahn et al., "Optimization of microbial poly(3-hydroxybutyate) recovery using dispersions of sodium-hypochlorite solution and chloroform," Biotechnology and Bioengineering (1994), vol. 44, pages 256-261; (3) J. A. Ramsay et al., "Recovery of poly-3-hydroxyalkanoic acid granules by surfactant-hypochlorite treatment," Biotechnology Techniques (1990), vol. 4, no. 4, pages 221-226; (4) Shih-Chen Tang, "Producing different polyhydroxyalkanates by microorganisms," Masters Thesis, 2007, Yuan Ze University, Department of biotechnology and bioinformatics; and (5) Xuping XU, et al., "Study on polyhydroxybutyrate (PHB) extraction from sphaerotilus natans by sodium hypochlorite-chloroform," Journal of FUJIAN normal university (natural science edition) (2004) vol. 20, no. 1, pages 74-77.

However, in order to obtain PHAs in relatively high purity and yield using the conventional methods, suitable microbial cells should be selected, and proper nutrients are needed to culture the microbial species with a sufficient period of time. Accordingly, the cost for recovery of PHAs using the conventional methods is high.

SUMMARY OF THE INVENTION

Therefore, an object of the present invention is to provide a method of recovering polyhydroxyalkanoates (PHAs) directly from municipal waste sludge that can overcome the aforesaid drawbacks associated with the prior art.

According to one aspect of this invention, a method of recovering polyhydroxyalkanoates (PHAs) from municipal waste sludge comprises:

(a) removing coarse particles in the municipal waste sludge and measuring a solid content in the municipal waste sludge in terms of a volatile suspended solid in the municipal waste sludge;

(b) removing a supernatant from the municipal waste sludge;

(c) freezing the municipal waste sludge to deactivate polyhydroxyalkanoates (PHAs) producing microbial species present in the municipal waste sludge to obtain a frozen sludge;

(d) conducting a pretreatment of the municipal waste sludge that has been frozen, the pretreatment including addition of sodium hypochlorite solution, followed by centrifugation to remove a supernatant therefrom and to obtain a pretreated sludge;

(e) adding a surfactant into the pretreated sludge to obtain a slurry, followed by centrifugation to remove a supernatant therefrom;

(f) adding a controlled amount of sodium hypochlorite solution to the municipal waste sludge obtained in step (e) so as to digest the PHAs producing microbial species and to release PHAs, a ratio of a volume of the sodium hypochlorite solution to the solid content of the municipal waste sludge ranging from 0.67 mg/ml to 1.25 mg/ml and being defined as a liquid-solid ratio; and (g) separating PHAs from non-PHAs substances in the municipal waste sludge obtained in the step (f).

According to another aspect of this invention, a method of recovering polyhydroxyalkanoates (PHAs) from municipal waste sludge comprises:

(a) removing coarse particles in the municipal waste sludge and measuring a solid content in the municipal waste sludge in terms of a concentration of volatile suspended solid (VSS) in the municipal waste sludge;

(b) removing a supernatant from the municipal waste sludge;

(c) freezing the municipal waste sludge to deactivate polyhydroxyalkanoates (PHAs) producing microbial species present in the municipal waste sludge to obtain a frozen sludge;

(d) conducting a pretreatment of the frozen sludge, the pretreatment including: (I) ultrasonic treating the municipal waste sludge, (II) adding sodium hypochlorite solution to the municipal waste sludge to digest the PHAs producing microbial species, and (III) heating the municipal waste sludge to a temperature ranging from 30° C. to 40° C., followed by centrifugation to remove a supernatant therefrom and to obtain a pretreated sludge;

(e) adding a solution of sodium dodecyl sulfate having a concentration ranging from 1 w/v % to 10 w/v % into the pretreated sludge to obtain a slurry, followed by centrifugation to remove a supernatant therefrom;

(f) adding a controlled amount of sodium hypochlorite solution having a concentration ranging from 40 v/v % to 100 v/v % to the municipal waste sludge obtained in step (e) so as to digest the PHAs producing microbial species and to release PHAs, a ratio of a volume of the sodium hypochlorite solution to the solid content of the municipal waste sludge ranging from 0.67 mg/ml to 1.0 mg/ml and being defined as a liquid-solid ratio; and (g) separating PHAs from non-PHA substances in the municipal waste sludge obtained in the step (f).

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
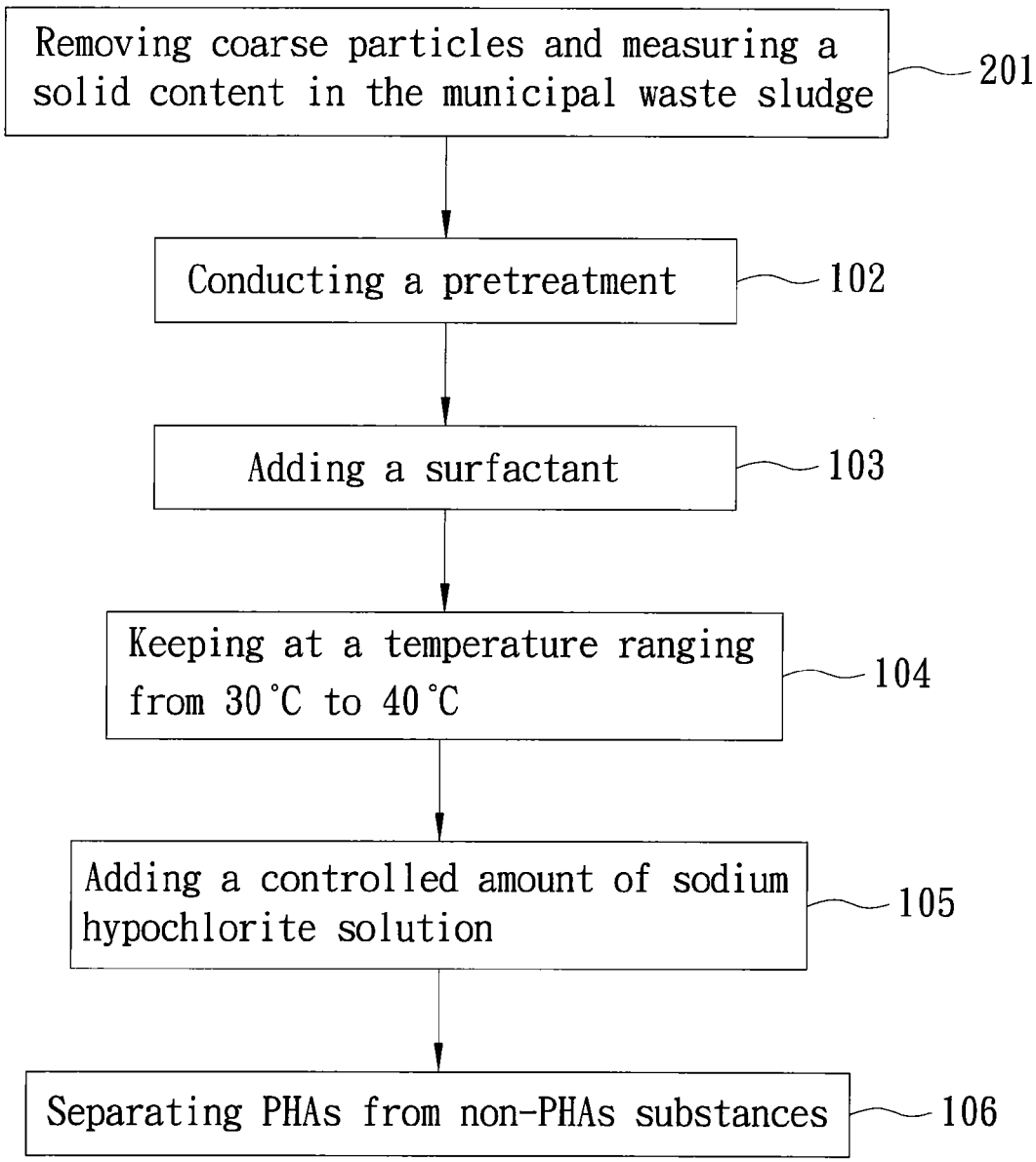
FIG. 1 is a flowchart illustrating a method of recovering polyhydroxyalkanoates (PHAs) from municipal waste sludge according to the preferred embodiment of the present invention.

The preferred embodiment of a method of recovering polyhydroxyalkanoates (PHAs) from municipal waste sludge according to the present invention comprises the steps illustrated in FIG. 1.

In step 101, coarse particles are removed from the municipal waste sludge, and a solid content in the municipal waste sludge is measured. The solid content is measured in terms of a concentration of volatile suspended solid (VSS) in the municipal wastes ludge. After cleaning and removal of a supernatant from the municipal waste sludge, the waste sludge is frozen at a temperature below 0° C. to deactivate polyhydroxyalkanoates (PHAs) producing microbial species present in the municipal waste sludge so that PHAs accumulated in the microorganisms can be prevented from being metabolized. In order to ensure deactivation of all of the PHAs producing microbial species, the municipal waste sludge is frozen at −20° C. Preferably, the municipal waste sludge is centrifuged at 3000 rpm for 10 minutes to remove a supernatant therefrom, cleaned using distilled water, and re-centrifuged to remove a supernatant therefrom. The sludge that has been cleaned and dewatered is frozen and stored at −20° C.

The municipal waste sludge is obtained from a municipal wastewater treatment plant.

In step 102, a pretreatment of the municipal waste sludge that has been frozen is conducted. The pretreatment includes addition of sodium hypochlorite solution to the municipal waste sludge to digest the PHAs producing microbial species, followed by removal of a supernatant from the municipal waste sludge to obtain a pretreated sludge. The concentration of the sodium hypochlorite solution in this step is preferably 30 v/v %. For details of the concentration, reference is made to Sei Kwang Hahn et al., "Optimization of microbial poly (3-hydroxybutyate) recovery using dispersions of sodium-hypochlorite solution and chloroform," Biotechnology and Bioengineering (1994), vol. 44, pages 256-261.

Preferably, the pretreatment further includes one of the following sub-steps:

(102-1) Ultrasonic Treating the Municipal Waste Sludge

Ultrasonic treating is carried out using an ultrasonic treating device to rupture microbial cell walls. In an embodiment, an ultrasonic treating device having a power of 9 watts is used. For details of the ultrasonic treating, reference is made to Shih-Chen Tang, "Producing different polyhydroxyalkanoates by microorganisms," Masters Thesis, 2007, Yuan Ze University, Department of biotechnology and bioinformatics; and (102-2) Heating the Municipal Waste Sludge The municipal waste sludge is heated to a temperature above 30° C. for a period of time in an embodiment. For control of the heating temperature, reference is made to Xuping XU, et al., "Study on poly-hydroxybutyrate (PHB) extraction from sphaerotilus natans by sodium hypochlorite-chloroform," Journal of FUJIAN normal university (natural science edition) (2004) vol. 20, no. 1, pages 74-77.

In order to investigate the effect of the heating temperature, four samples of the municipal waste sludge that has been frozen are pretreated at room temperature, 37° C., 45° C. and 55° C., respectively. The samples that have been pretreated were subjected to the subsequent steps 103, 104, 105 of the method illustrated in FIG. 1. It is found that when the pretreatment is conducted at 37° C., the purity of PHAs produced by the method is the highest. Therefore, the heating temperature for the pretreatment is preferably 37° C.

In step 103, a surfactant is added into the pretreated sludge to obtain a slurry, followed by centrifugation to remove a supernatant from the slurry. Because surfactant molecules will enter and bond to cellular membranes (i.e., phospholipid bilayers) of the PHAs producing microbial species to form a large amount of micelles and to increase the volume of the cellular membranes, it would rupture the cellular membranes to release PHAs if the surfactant molecules are increased from its saturation state. Besides, since the surfactant may result in the denaturation and solubilization of proteins, the cellular membranes may be ruptured more easily by addition of the surfactant even if the surfactant molecules are not saturated. Preferably, the surfactant is a solution of sodium dodecyl sulfate (SDS) having a concentration ranging from 1 w/v % to 10 w/v %. It is found that when the concentration of the SDS solution is in the above range, the results of recovering PHAs are the same. Accordingly, in order to reduce the cost, the concentration of the SDS solution in the following experiments is preferably 1 w/v %.

It is worth mentioning that the pretreatment in step 102 provides an initial rupturing of outer cell walls of microbial species, which enables the surfactant added in step 103 to rapidly rupture microbial cells, thereby increasing the efficiency of extraction of PHAs.

In step 104, the municipal waste sludge obtained in the step 103 is kept at a temperature ranging from 30° C. to 40° C. to facilitate a reaction between the surfactant and the PHAs producing microbial species, wherein a temperature of 37° C. is preferred. However, when the temperature is higher than 40° C., the PHAs producing microbial species may be ruptured excessively to adverse the recovery result for PHAs.

In step 105, a controlled amount of sodium hypochlorite solution is added to the municipal waste sludge obtained in step 104 so as to digest the PHAs producing microbial species and to release PHAs. The amount of the sodium hypochlorite solution is determined based on the solid content (i.e., volatile suspended solid (VSS)) contained in the municipal waste sludge. A ratio of the solid content (VSS) of the municipal waste sludge to a volume of sodium hypochlorite solution added in this step should range from 0.67 mg/ml to 1.25 mg/ml. The term "liquid-solid ratio" used hereinafter refers to the ratio as specified above. Preferably, the liquid-solid ratio ranges from 0.67 mg/ml to 1 mg/ml, and 1 mg/ml is most preferred. If the liquid-solid ratio is overly low (i.e., the sludge amount is much less than an amount that can be treated by the sodium hypochlorite solution added to the sludge), the sodium hypochlorite solution cannot be fully utilized, and PHAs contained in the municipal waste sludge may be damaged by an excess amount of the sodium hypochlorite solution. On the other hand, if the liquid-solid ratio is overly high (i.e., the sludge amount is much greater than an amount that can be treated by the sodium hypochlorite solution added to the sludge), the sodium hypochlorite solution cannot effectively digest the PHAs producing microbial species. Accordingly, as long as the liquid-solid ratio is out of the range specified above, PHAs cannot be produced efficiently, and purity and yield of the PHAs may be relatively low.

Moreover, the concentration of the sodium hypochlorite solution preferably ranges from 40 v/v % to 100 v/v %, and more preferably ranges from 40 v/v % to 80 v/v %. The release of PHAs may increase with an increase in the concentration of the sodium hypochlorite solution. However, if the concentration is too high, PHAs in the municipal waste sludge may be damaged by an excess amount of the sodium hypochlorite solution. In consideration of the cost, the concentration of sodium hypochlorite solution is preferably 40 v/v %.

Since the sodium hypochlorite solution is capable of digesting the non-PHAs substances of the PHAs producing microbial species in the municipal waste sludge into relatively small pieces, PHAs in the municipal waste sludge may be released more efficiently and the non-PHAs substances may be removed from the municipal waste sludge through centrifugation more easily.

In step 106, PHAs are separated from non-PHAs substances in the municipal waste sludge obtained in the step 105 to obtain a purified PHAs precipitate. In this embodiment, the step 106 is conducted by adding deionized water to the sludge obtained in the step 105 to dilute the concentration of the sodium hypochlorite solution to prevent PHAs from being seriously degraded, followed by centrifugation to remove a supernatant from the sludge and to obtain a precipitate. When the precipitate is not a pure white powder, it is preferable to add deionized water to the precipitate, followed by removing a supernatant therefrom using centrifugation to remove a residue of the sodium hypochlorite solution and impurities. If the precipitate is still not a pure white powder, sodium hypochlorite solution and deionized water may be further added to the precipitate, followed by removing a supernatant therefrom using centrifugation. The above addition and centrifugation steps may be repeated until a white PHAs precipitate is obtained. The purpose of the above addition step is to digest the impurities using the sodium hypochlorite solution, and to clean the precipitate using the deionized water.

In the following experiments, it is demonstrated that the method of this invention can directly recover PHAs from the municipal waste sludge in a relatively high purity and that the pretreatment, the liquid-solid ratio and the concentration of the sodium hypochlorite solution are important for purity and yield (i.e., PHAs content) of the product made by the method according to the present invention. The PHAs purity can be calculated using the following equation:

PHAs purity=$(C1+C2)/W1$ where $W1$ is the weight of the dried PHAs powder, $C1$ and $C2$ are respectively the weights of PHB and PHV that are contained in the dried PHAs powder and that are measured by dissolving a predetermined amount of the dried PHAs powder into chloroform, followed by a quantitative analysis through a gas chromatography-mass spectrometry (GC-MS) technique.

PHAs content=$(C1+C2)/W2$ where $W2$ is the solid content (VSS) of the municipal waste sludge measured in the step 101, and is measured using a mixed liquor suspended solids (MLSS) analysis (NIEA W210.57A).

GC-MS is performed with a GC-17A capillary column (length: 30 m; diameter: 0.25 mm) and a flame ionization detector (FID). The flow rate of the carrier gas (nitrogen) is 2 ml/min. For each test, 2 μl of the test sample is injected into the injection port (split ratio: 1/20). The injection port and the FID respectively have the temperature of 230° C. and 275° C. The temperature in the chamber receiving the capillary column is controlled to be 80° C. for 4 minutes, and is then raised to 160° C. at a rate of 8° C./10 minutes.

Besides, the volume (i.e., the controlled amount) of sodium hypochlorite solution used in the step 105 is calculated by dividing the solid content of the municipal waste sludge ($W2$) by the predetermined liquid-solid ratio (the ratio of the solid content of the municipal waste sludge to the volume of the sodium hypochlorite solution predetermined for use in step 105).

Experiment 1

Effect of a Pretreatment on Recovery of PHAs

A predetermined amount of municipal waste sludge was collected from a municipal wastewater treatment plant, and coarse particles in the municipal waste sludge were removed using a 1 mm filter screen, followed by conducting MLSS analysis on 20 mg~30 mg of the sludge that has been screened to measure the solid content in the screened sludge. The screened sludge was centrifuged at 3000 rpm to remove a supernatant therefrom, and frozen at −20° C. to obtain a frozen sludge. Although the step of freezing the screened sludge may be omitted, in order to prevent PHAs in the polyhydroxyalkanoates (PHAs) producing microbial species from being metabolized, it is preferable to conduct a freezing step for 1 hour. In the first experiment, four test samples of the frozen sludge were prepared, and were respectively subjected to the following four different pretreatments: (i) adding 5 ml of a sodium hypochlorite solution (30 v/v %), and allowing the mixture of the sodium hypochlorite solution and the municipal waste sludge to stand for 3 hours; (ii) adding 5 ml of the sodium hypochlorite solution (30 v/v %), and allowing the mixture of the sodium hypochlorite solution and the municipal waste sludge to stand for 3 hours at 37° C.; (iii) ultrasonic treating at a power of 9 watts for 1 minute, adding 5 ml of the sodium hypochlorite solution (30 v/v %), and allowing the mixture of the sodium hypochlorite solution and the municipal waste sludge to stand for 3 hours; and (iv) ultrasonic treating at a power of 9 watts for 1 minute, adding 5 ml of the sodium hypochlorite solution (30 v/v %), and allowing the mixture of the sodium hypochlorite solution and the municipal waste sludge to stand for 3 hours at 37° C.

After the pretreatment, each of the four test samples was centrifuged to remove a supernatant therefrom, and was mixed with the sodium hypochlorite solution (30 v/v %) to obtain a treated sludge so that the treated sludge has a liquid-solid ratio of 1.0 mg/ml. The treated sludge of each test sample was left to stand at 37° C. for 15 minutes, centrifuged to remove a supernatant therefrom, and dried in an oven to obtain a PHAs precipitate. The total weight of PHAs including PHB and PHV for each test sample was measured using a GC-MS technique, and the PHAs purity in each test sample was estimated as listed in Table 1.

TABLE 1

| Pretreatment | PHAs purity (wt %) | PHAs content* (mgPHA/gVSS) |
|---|---|---|
| (i) | 20.4 ± 2.10 | 24.2 ± 0.30 |
| (ii) | 20.6 ± 0.90 | 23.9 ± 0.25 |

TABLE 1-continued

| Pretreatment | PHAs purity (wt %) | PHAs content* (mgPHA/gVSS) |
|---|---|---|
| (iii) | 27.2 ± 2.00 | 23.8 ± 0.27 |
| (iv) | 28.8 ± 0.50 | 23.7 ± 0.37 |

*PHAs content means the total weight (mg) of PHAs per gram of VSS (volatile suspended solids).

The results in Table 1 show that the pretreatment does indeed influence the extraction result of PHAs, and that the PHAs purity is relatively high when the pretreatment (iii) or (iv) is conducted. Among the four pretreatments, the precipitate that was subjected to the pretreatment (iv) has the highest PHAs purity, and thus, in the following experiments, the pretreatment (iv) was used.

Experiment 2

Effect of a Concentration of a Sodium Hypochlorite Solution in Step 105 on Recovery of PHAs Ten test samples were prepared following the procedure used in experiment 1 to obtain samples of the frozen sludge. The frozen sludge for each test examples was subjected to the pretreatment (iv), mixed with 10 ml of a SDS solution (1 w/v %), left to stand at 37° C. for 15 minutes, and centrifuged to remove a supernatant therefrom. Thereafter, the ten test samples ware respectively mixed with sodium hypochlorite solutions in different concentrations of 5 v/v %, 10 v/v %, 15 v/v %, 20 v/v %, 25 v/v %, 30 v/v %, 40 v/v %, 60 v/v %, 80 v/v %, and 100 v/v %, so that each of the test samples has a liquid-solid ratio of 1.0 mg/ml and was left to stand at room temperature for 15 minutes. Subsequently, each of the test samples was mixed with deionized water (10 ml~20 ml), followed by centrifugation at 3000 rpm for 20 minutes to remove a supernatant therefrom. If the precipitate is not a pure white powder, it is necessary to repeat the following steps until a white PHAs precipitate was obtained: adding the sodium hypochlorite solution and the deionized water in the precipitate, followed by removing a supernatant therefrom using centrifugation.

Figure 2:
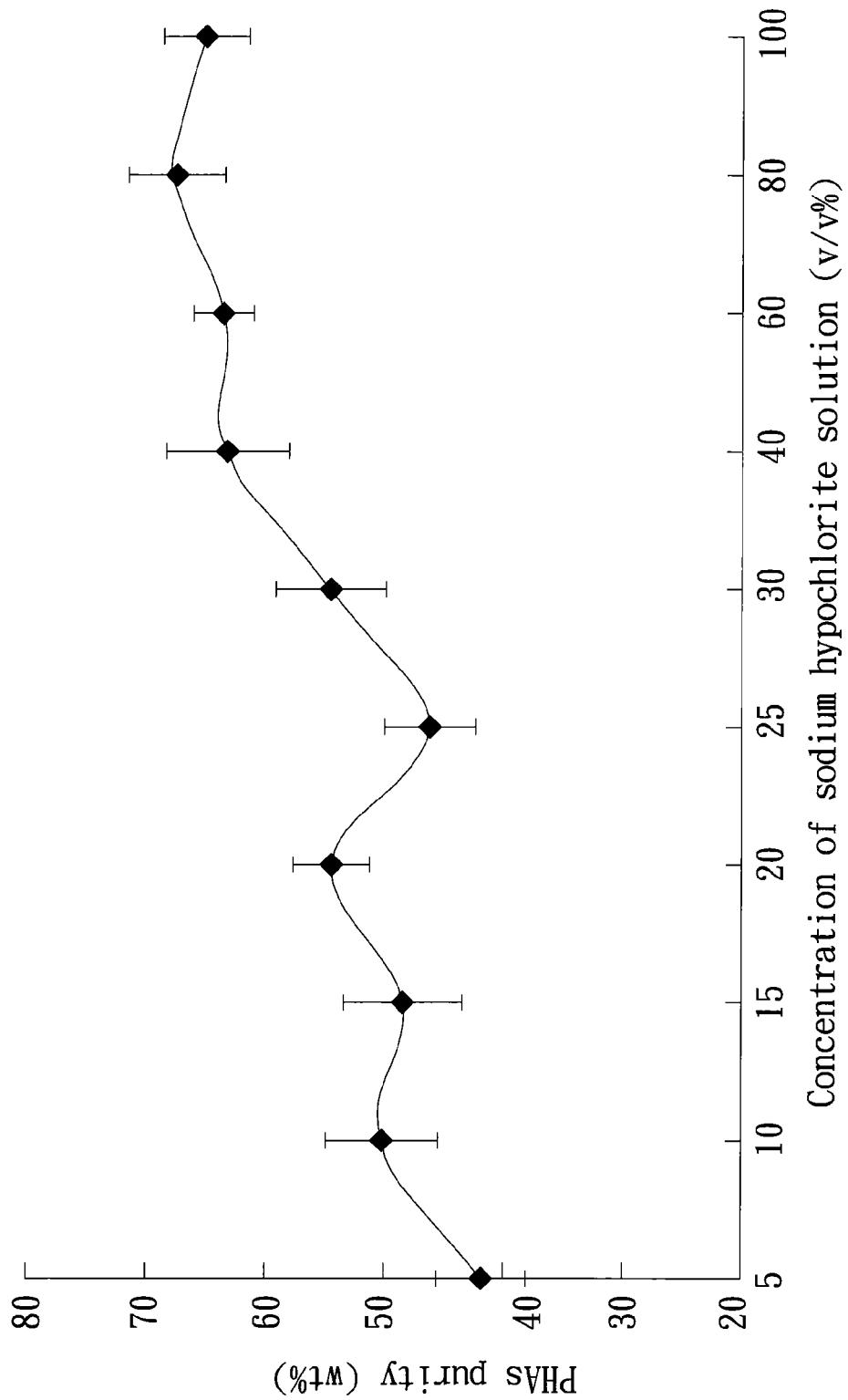
FIG. 2 is a plot illustrating the relation between concentrations of sodium hypochlorite solution and PHAs purity of a PHAs precipitate obtained by the method of the preferred embodiment according to the present invention.

After measuring the weight of the PHAs precipitate and the total weight of PHAs using GC-MS, the PHAs purities of the ten test samples are 41.8±3.62 wt %, 50.1±4.67 wt %, 48.4±4.79 wt %, 54.3±3.25 wt %, 46.2±3.64 wt %, 54.4±4.44 wt %, 63.2±5.04 wt %, 63.5±2.40 wt %, 67.4±3.91 wt % and 65.0±3.49 wt %, respectively, as shown in FIG. 2. When the concentration of the sodium hypochlorite solution increases from 5 v/v % to 40 v/v %, the PHAs purity is also increased. When the concentration of the sodium hypochlorite solution ranges from 40 v/v % to 100 v/v %, the slope of the PHAs purity becomes small. In consideration of the recovery cost, in the experiments 3 and 4, the concentration of the sodium hypochlorite solution that is added in step 105 is set to 40 v/v %.

Experiment 3

Effect of a Liquid-Solid Ratio on Recovery of PHAs

Eight test samples were prepared following the procedure employed in experiment 2 except that the concentration of the sodium hypochlorite solution added in step 105 is set to 40 v/v %, and that the liquid-solid ratios for the eight test samples are 0.33 mg/ml, 0.40 mg/ml, 0.50 mg/ml, 0.67 mg/ml, 1.00 mg/ml, 1.25 mg/ml, 1.50 mg/ml and 1.75 mg/ml, respectively. The test results of the experiment 3 are shown in Table 1.

TABLE 1

| | Liquid-solid ratio(mg/ml) | | | | | | | |
|---|---|---|---|---|---|---|---|---|
| | 0.33 | 0.40 | 0.50 | 0.67 | 1.00 | 1.25 | 1.50 | 1.75 |
| PHAs purity (wt %) | 23.4 ± 0.15 | 42.2 ± 5.55 | 48.2 ± 3.28 | 93.2 ± 4.77 | >99.0 | 63.0 ± 8.14 | 62.2 ± 1.24 | 61.1 ± 3.55 |
| PHAs content (mgPHA/gVSS) | 17.7 ± 2.23 | 22.1 ± 2.79 | 26.9 ± 3.35 | 34.8 ± 4.62 | 58.0 ± 7.19 | 41.2 ± 0.35 | 44.5 ± 0.67 | 46.1 ± 9.36 |

When the liquid-solid ratio increases from 0.33 mg/ml to 1.00 mg/ml, both of PHAs purity and PHAs content increase accordingly. When the liquid-solid ratio is greater than 1.00 mg/ml, both of PHAs purity and PHAs content decrease. It is speculated that when the liquid-solid ratio is too high, the amount of the sludge is overly high, and the amount of the sodium hypochlorite solution might be insufficient to rupture the cell walls of the microbial species efficiently. Accordingly, the liquid-solid ratio is preferably 1.00 mg/ml.

Experiment 4

Effect of a Standing Time for Allowing the Sludge to Stand Together with the Sodium Hypochlorite Solution in Step 105

Thirteen test samples were prepared following the procedure of experiment 3 except that the liquid-solid ratios in each test sample is 1.00 mg/ml, and that the thirteen test samples were left to stand at 37° C. together with the sodium hypochlorite solution added in step 105.

The standing times for the thirteen test samples are 5 minutes, 10 minutes, 15 minutes, 30 minutes, 45 minutes, 60 minutes, 90 minutes, 120 minutes, 240 minutes, 360 minutes, 480 minutes, 600 minutes and 720 minutes, respectively.

After measuring the weight of the PHAs precipitate and the total weight of PHAs using GC-MS, it is found that the PHAs purities of all test samples are greater than 99.0 wt %. In order to save the process time and in order to prevent PHAs from being damaged by the sodium hypochlorite solution if the standing time is longer, the standing time is preferably 5 minutes.

Based on the results of the experiments 2 to 4, in order to obtain a PHAs precipitate with a relatively high PHAs purity, it is preferable to use the sodium hypochlorite solution of 40 v/v %, and a liquid-solid ratio of 1.00 mg/ml with a standing time of 5 minutes at 37° C.

In summary, the method of this invention has the following advantages:

(1) The method of this invention is capable of directly extracting PHAs from the waste sludge without culturing PHAs-producing microorganisms that is time-consuming and not cost-effective. Thus, by virtue of the method of this invention, the cost and time concerning the culture of PHAs-producing microorganisms can be saved.

(2) By limiting the liquid-solid ratio employed in steps 105 of the method according to the present invention to a specific range, the PHAs precipitate extracted from the municipal waste sludge can have a PHAs purity greater than 99.0 wt %. Thus, the method of this invention may be used to produce PHAs on an industrial scale.

(3) The main extracting agent used in this invention is a sodium hypochlorite solution that is environmental-friendly, and thus, the method of this invention is expected to have a relatively low environmental impact.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A method of recovering polyhydroxyalkanoates (PHAs) from municipal waste sludge, comprising:
    (a) removing coarse particles in the municipal waste sludge and measuring a mass of a solid content in the municipal waste sludge in terms of a volatile suspended solid in the municipal waste sludge;
    (b) removing a supernatant from the municipal waste sludge;
    (c) freezing the municipal waste sludge to deactivate polyhydroxyalkanoates (PHAs) producing microbial species present in the municipal waste sludge to obtain a frozen sludge;
    (d) conducting a pretreatment of the municipal waste sludge that has been frozen, the pretreatment including addition of sodium hypochlorite solution, followed by centrifugation to remove a supernatant therefrom and to obtain a pretreated sludge;
    (e) adding a surfactant into the pretreated sludge to obtain a slurry, followed by centrifugation to remove a supernatant therefrom;
    (f) adding a controlled amount of sodium hypochlorite solution to the municipal waste sludge obtained in step (e) so as to digest the PHAs producing microbial species and to release PHAs, wherein a ratio of the mass of the solid content of the municipal waste sludge to a volume of the sodium hypochlorite solution added ranges from 0.67 mg/ml to 1.25 mg/ml; and
    (g) separating PHAs from non-PHAs substances in the municipal waste sludge obtained in step (f).

2. The method of claim 1, wherein the ratio ranges from 0.67 mg/ml to 1.0 mg/ml.

3. The method of claim 1, wherein the sodium hypochlorite solution in step (f) has a concentration ranging from 40 v/v % to 100 v/v %.

4. The method of claim 2, wherein the surfactant is sodium dodecyl sulfate.

5. The method of claim 4, wherein the sodium dodecyl sulfate has a concentration ranging from 1 w/v % to 10 w/v %.

6. The method of claim 1, wherein step (g) is conducted by adding deionized water to the sludge obtained in step (f), followed by centrifugation to remove a supernatant therefrom and to obtain a precipitate.

7. The method of claim 1, wherein the pretreatment includes at least one of the following sub-steps: (I) ultrasonic treatment of the frozen sludge; and
    (II) treating the frozen sludge at a temperature ranging from 30° C. to 40° C.

8. The method of claim 1, wherein the slurry in step (d) is kept at a temperature ranging from 30° C. to 40° C.

9. The method of claim 6, further comprising after step (f): adding sodium hypochlorite solution and deionized water to the precipitate, followed by removing a supernatant therefrom using centrifugation.

10. A method of recovering polyhydroxyalkanoates (PHAs) from municipal waste sludge, comprising:
    (a) removing coarse particles in the municipal waste sludge and measuring a mass of a solid content in the municipal waste sludge in terms of a concentration of volatile suspended solid (VSS) in the municipal waste sludge;
    (b) removing a supernatant from the municipal waste sludge;
    (c) freezing the municipal waste sludge to deactivate polyhydroxyalkanoates (PHAs) producing microbial species present in the municipal waste sludge to obtain a frozen sludge;
    (d) conducting a pretreatment of the frozen sludge, the pretreatment including: (I) ultrasonic treatment of the municipal waste sludge, (II) adding sodium hypochlorite solution to the municipal waste sludge to digest the PHAs producing microbial species, and (III) heating the municipal waste sludge to a temperature ranging from 30° C. to 40° C., followed by centrifugation to remove a supernatant therefrom and to obtain a pretreated sludge;
    (e) adding a solution of sodium dodecyl sulfate having a concentration ranging from 1 w/v % to 10 w/v % into the pretreated sludge to obtain a slurry, followed by centrifugation to remove a supernatant therefrom;
    (f) adding a controlled amount of sodium hypochlorite solution having a concentration ranging from 40 v/v % to 100 v/v % to the municipal waste sludge obtained in step (e) so as to digest the PHAs producing microbial species and to release PHAs, wherein a ratio of the mass of the solid content of the municipal waste sludge to a volume of the sodium hypochlorite solution added ranges from 0.67 mg/ml to 1.0 mg/ml; and
    (g) separating PHAs from non-PHAs substances in the municipal waste sludge obtained in step (f).

* * * * *